United States Patent [19]

Jacob et al.

[11] Patent Number: 5,611,733

[45] Date of Patent: Mar. 18, 1997

[54] DRIVESHAFT WITH PLUNGING PART

[75] Inventors: Werner Jacob, Frankfurt; Manfred Niederhüfner, Hanau; Jürgen E. Heyne, Saarbrucken, all of Germany

[73] Assignee: Löhr & Bromkamp GmbH, Offenbach am Main, Germany

[21] Appl. No.: 456,177

[22] Filed: May 31, 1995

[30]  Foreign Application Priority Data

Jun. 3, 1994 [DE] Germany .......................... 44 19 373.4

[51] Int. Cl.$^6$ ...................................................... F16C 3/03
[52] U.S. Cl. .......................... 464/140; 464/182; 464/906
[58] Field of Search ...................................... 464/179, 178, 464/182, 140, 141, 906, 139, 168, 167; 403/164, 165

[56]  References Cited

U.S. PATENT DOCUMENTS

| | | | |
|---|---|---|---|
| 1,022,909 | 4/1912 | Whitney | 464/167 X |
| 3,203,202 | 8/1965 | Broenyer | 464/167 |
| 4,075,872 | 2/1978 | Geisthoff | 464/167 |
| 4,103,514 | 8/1978 | Grosse-Entrump | 464/167 |

FOREIGN PATENT DOCUMENTS

| | | |
|---|---|---|
| 1373752 | 8/1964 | France . |
| 2164033 | 7/1973 | France . |
| 2531374A1 | 2/1977 | Germany . |
| 2540371A1 | 3/1977 | Germany . |
| 2532674B2 | 3/1979 | Germany . |
| 2801182B1 | 6/1979 | Germany . |
| 2602074C2 | 10/1984 | Germany . |
| 2737104C2 | 4/1985 | Germany . |
| 4217322C1 | 12/1993 | Germany . |
| 1340644 | 12/1973 | United Kingdom . |

Primary Examiner—John P. Darling
Assistant Examiner—Eileen A. Dunn
Attorney, Agent, or Firm—Harness, Dickey & Pierce, P.L.C.

[57]  ABSTRACT

A driveshaft (1) for driving the wheels of a motor vehicle has two constant velocity joints (2, 3) and a connecting shaft (4). The two constant velocity joints (2, 3) are provided in the form of constant velocity fixed joints. The plunging assembly required to change the longitudinal distance (L) includes a plunging journal (21), formed onto the second joint part (20) of the second constant velocity joint (3), and a plunging portion (26) of the connecting shaft (4). The shaft (4) surrounds the plunging journal (21) and is provided in the form of a tubular shaft. The cross-section of the plunging portion (26) has the shape of a corrugated shaft. Each outer corrugation peak, in the bore of the plunging portion (26), includes a second running groove (29) positioned opposite a running groove (22) in the plunging journal (21). Balls (23) are rollingly arranged between the two running grooves (29, 22) and held by a cage (24). By providing the plunging portion (26) of the connecting shaft (4) in the form of a corrugated tube, it is possible to use less mass and to increase the strength values as a result of the forming operation. At the same time, the vibration behavior is improved.

19 Claims, 2 Drawing Sheets

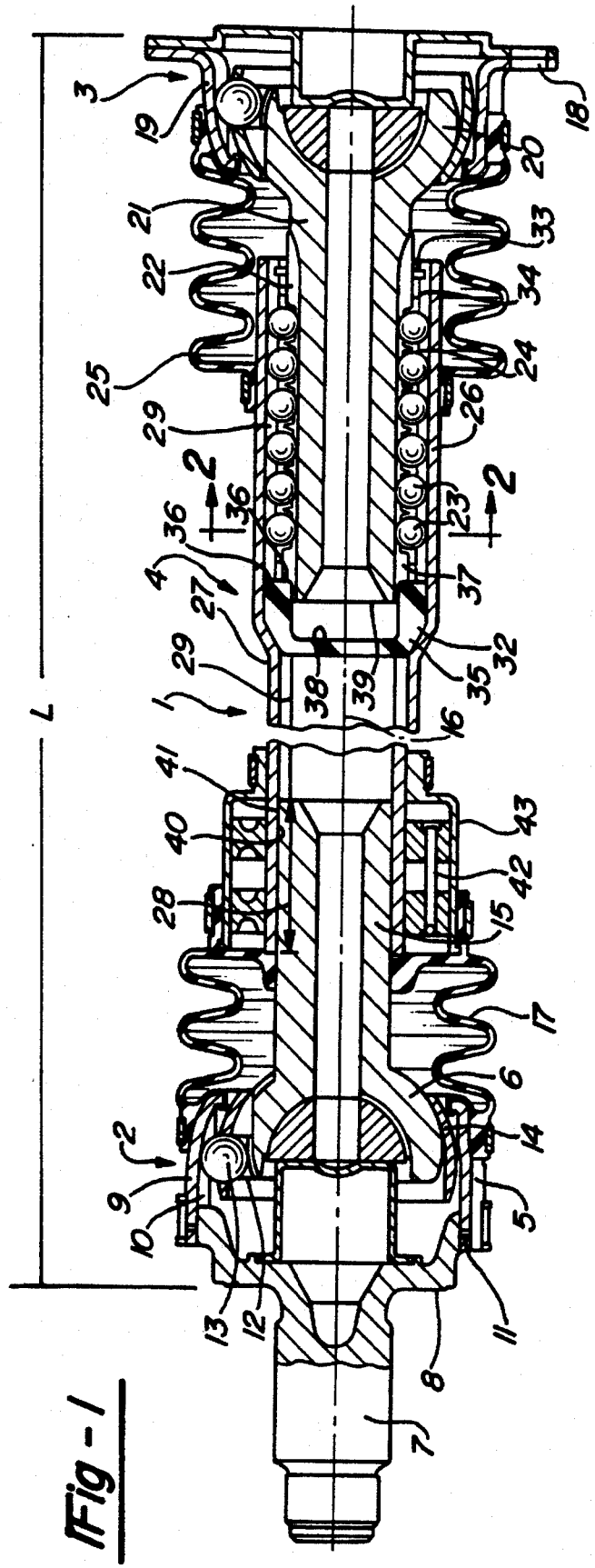

DRIVESHAFT WITH PLUNGING PART

BACKGROUND OF THE INVENTION

The invention relates to a driveshaft for use in a driveline to drive wheels of a motor vehicle. The driveshaft has two constant velocity joints each having a first joint part with connecting means to establish a connection with a driving or driven part of the driveline. Each joint has a second joint part. The two constant velocity joints are connected to one another by a connecting shaft. The two joints are designed as constant velocity fixed joints which enable only angular movements between their two respective joint parts. The driveshaft also includes means for enabling a change in the distance between the connecting means.

U.S. Pat. No. 4,950,206 issued Aug. 21, 1990, discloses a driveshaft wherein the second joint part of one of the constant velocity joints is extended in a sleeve-like way and includes a bore provided with running grooves. The connecting shaft is inserted into the bore and, on its outer face, it also includes running grooves arranged so as to correspond to those of the second joint part. The opposed running grooves contain rolling contact members in the form of balls. The axial movement of the connecting shaft relative to the second joint part is limited by stops. The connecting shaft is a solid shaft and designed to be integral with the second joint part of the other constant velocity joint. Furthermore, it is possible to assemble the connecting shaft from a thin-walled tube and two journals, with one of the journals directly connected to the second joint part of the other joint without the plunging facility.

In such an embodiment, the size of the constant velocity joint has to be such that it is adapted to the cross-section of the plunging part, which, with respect to diameter, is dimensioned to meet torque transmitting requirements. This means that the diameter of the joint has to be greater than that normally required for torque transmitting purposes. Furthermore, the second joint part, which constitutes the inner part, in addition to including space to accommodate the journal, is provided with a radial wall thickness between the bore and inner running track, which takes account the respective strength requirements.

DE 41 19 451 C2, issued Mar. 25, 1993, describes a jointed shaft intended to be used as a steering shaft for motor vehicles. It consists of the joints provided in the form of universal joints, and a plunging part. The plunging part includes a two-rib tube. The two ribs form running grooves. An inner part associated with two ball circulation guides offset by 180° is inserted into the two-rib tube. Such a design is complicated and expensive and requires a great deal of space to accommodate the two ball circulation guides. With steering shafts, such space is available. Furthermore, in the case of steering shafts, the mass to be moved is of no great significance as the steering shaft is moved for the purpose of the steering movement only and the resulting speeds are extremely low.

SUMMARY OF THE INVENTION

It is an object of the invention to provide a driveshaft which has a driving function, especially to drive the wheels of a motor vehicle. The driveshaft includes two constant velocity fixed joints and means for enabling a change in the distance between the connecting means of the constant velocity joints. Also, the shaft enables a smaller diameter of the constant velocity joints, with the connecting shaft as light as possible to keep the weight of the moved masses low.

In accordance with the invention, the objective is achieved by providing one of the two joint parts with a plunging journal. The journal longitudinal axis is identical to that of the associated second joint part. The plunging journal, in its outer face, has a plurality of circumferentially distributed first running grooves extending parallel to the longitudinal axis. The connecting shaft is provided in the form of a tube with a plunging portion which is movably entered by the plunging journal. The cross-section of the plunging portion is corrugated, with an outer corrugation peak and an outer corrugation valley alternating on the outer circumference. The bore of the plunging portion includes second running grooves which are positioned opposite the first running grooves of the plunging journal and extend parallel to the longitudinal axis. The second running grooves are arranged in an outer corrugation peak. The first and second running grooves, one of each form a pair, receive a plurality of rolling contact members arranged one behind the other along the running groove.

The advantage of providing the plunging portion in the form of a tube with a corrugated cross-section is that it is possible to select a relatively thin-walled tube to accommodate the torque because the corrugated shape leads to a high torque transmitting capacity. Furthermore, such an embodiment is advantageous in that it reduces vibrations because, although the corrugated tube shape results in a high degree of elasticity, it causes the vibrations to be modulated. The critical shaft speed is moved into a range which is outside the operating speed range. In the case of driveshafts used as vehicle sideshafts for example and serving to transmit the rotational movement from the axle differential to the wheels, the driveshaft speeds amount to up to 2000 revolutions per minute. As a result, the noise behavior is affected advantageously.

There exists a further advantage in that, due to the separate plunging assembly, it is possible, for assembly purposes, to provide a longer distance than required for normal operation in the assembled condition. In this way, assembly of the driveshaft in the motor vehicle is also facilitated. A further advantage as compared to driveshafts wherein one of the joints is a plunging joint is that the torque transmitting capacity can be improved of the joint accommodating the plunging movement. Furthermore, during torque transmission and angular movements of a joint designed as a plunging joint, the friction values and thus the plunging resistance are higher than in those cases where the torque transmitting function under angular movements and the function of accommodating plunging movements, resulting from the angular movements and compression of the vehicle, are associated with separate components.

Particularly advantageous strength conditions are achieved if the plunging portion is manufactured by a non-chip producing forming operation. The plunging portion is preferably produced by hammering or rolling using correspondingly shaped hammering or pressure tools, or by drawing using a drawing tool, starting from a round drawn or welded tube which is given its corrugated shape by a non-chip forming operation.

By carrying out a non-chip producing cold forming operation on the part, it is possible to achieve an increase in strength. Furthermore, it is possible to achieve smooth surfaces which are particularly suitable for the rolling movement of the rolling contact members.

According to a further embodiment, the rolling contact members associated with all the running grooves are held in a cage. The cage is movable to a limited extent relative to the plunging journal and the plunging portion along the longitudinal axis. The advantage of this embodiment is the balls are guided and during the occurring movements the cage is adjusted such that rolling contact movement takes place between the plunging portion and the plunging journal. The cage may be plastics and may be produced by injection molding.

To limit the plunging movement, the plunging portion is provided with stops which cooperate either with the rolling contact members and/or the cage. The plunging portion may additionally be provided with a further plunging stop. The plunging journal stopping thereagainst to limit the distance which the plunging journal is inserted into the plunging portion. This may be of significance, for example, from the assembly viewpoint.

In a preferred embodiment, one of the stops and/or the plunging stop form part of an insert inserted into the plunging portion. In a further embodiment of the invention, the plunging journal may be hollow. It is provided with a through-bore.

Apart from comprising the plunging portion, the connecting shaft may additionally be provided with a connecting portion to secure to the second joint part of the other constant velocity joint. The connecting portion may start directly from the plunging portion. However, there is also proposed a portion of transition which is arranged between the plunging portion and the connecting portion and whose cross-sectional shape, for example, deviates from that of the plunging portion and/or of the connecting portion.

The cross-section of the plunging portion is preferably increased relative to that of the portion of transition and/or that of the connecting portion in order to make available the space required to accommodate the rolling contact members. The cross-section of the plunging journal is the critical cross-section whose strength is such to withstand the transmitted torque. The plunging portion may be designed accordingly.

The vibration behavior of the connecting shaft is advantageously affected if the corrugated shape of the plunging portion is continued in the portion of transition and/or the connecting portion.

The stops are preferably associated with an insert which is supported against a shoulder formed, as a result of a cross-sectional reduction, in the region of transition between the plunging portion and the adjoining portion, the portion of transition or the connecting portion.

To provide a connection between the connecting shaft and the second joint part of the other constant velocity joint, a connecting journal is provided which constitutes an extension of the longitudinal axis of the second joint part. The connecting journal engages the connecting portion of the connecting shaft and is secured thereto. In a further embodiment, the connecting journal includes a corrugated shape which is adapted to the corrugated shape of the connecting portion. The corrugated shapes of the connecting journal and connecting portion complement one another so that a non-rotating connection is achieved between the two parts.

In yet a further embodiment, the connecting journal may be connected to the connecting portion by clamping means.

The rolling contact members of the plunging part are preferably provided in the form of balls.

The running grooves of the plunging journal, too, may be manufactured by a non-chip producing forming operation. Their production may take place simultaneously with the non-chip producing forming operation of the second joint part, which serves, for example, to produce the running grooves of the second joint parts and the functional faces thereof.

From the following detailed description taken in conjunction with the accompanying drawings and subjoined claims, other objects and advantages of the present invention will become apparent to those skilled in the art.

BRIEF DESCRIPTION OF THE DRAWINGS

Two preferred embodiments of the invention and an example of arranging the driveshaft in a motor vehicle are diagrammatically illustrated in the drawing wherein:

FIG. 1 is a longitudinal section view through a driveshaft in accordance with the invention, with the constant velocity joints being in an extended position.

FIG. 2 is a section view along line II—II of FIG. 1.

DETAILED DESCRIPTION OF THE DRAWINGS

Figure 3:
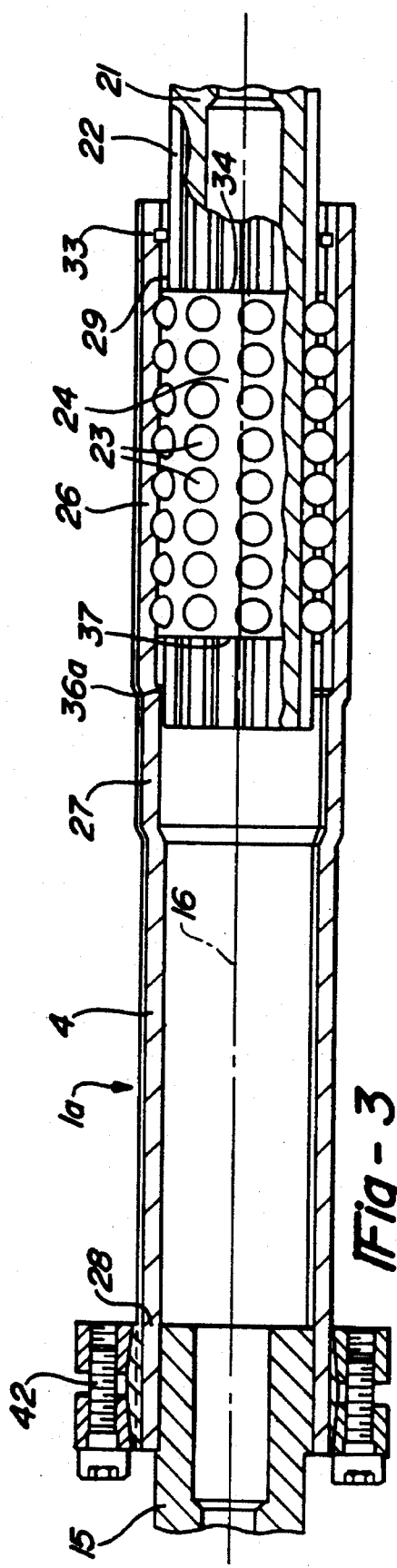
FIG. 3 is a longitudinal section view of an alternative driveshaft embodiment, with the plunging portion differing from that shown in FIG. 1, however, the two joints to which the connecting shaft is attached are not shown; only the journal serving to connect them is illustrated.

The driveshaft 1 as shown in FIG. 1 includes a first constant velocity joint 2 and second constant velocity joint 3. The two constant velocity joints 2, 3 are constant velocity fixed joints which are connected to one another by a connecting shaft 4. The two constant velocity joints 2, 3 are basically identical; they only differ with respect to their connecting means.

The first constant velocity joint 2 includes of a first joint part 5, constituting the outer part, whose cavity accommodates a second joint part 6, constituting the inner part. Furthermore, the first joint part 5 includes connecting means 7 in the form of a connecting journal which has a contact shoulder 8 against which rests a corresponding contact face of a part to which the constant velocity joint 2 is to be connected.

The first joint part 5 of the first constant velocity joint 2 includes the outer joint part 9. The outer joint part 9 is provided in the form of a sheet metal part and includes outer running grooves 10. Also, joint 5 includes the connecting journal 7 having the contact shoulder 8. The outer joint part 9 and the connecting journal 7 are connected to one another by a weld 11.

The second joint part 6 is received in the outer joint part 9 in the form of the inner part. On its outer face, it includes inner running grooves 12, with each inner running groove 12 positioned opposite an outer running groove 10 of the outer joint part 9. Both grooves 10, 12, jointly, accommodate a ball 13. The balls 13 of all pairs of outer running grooves 10 and inner running grooves 12 are guided in a joint cage 14 arranged between the outer face of the second joint part 6 and the inner face of the outer joint part 9. A connecting journal 15 is integrally connected to the portion of the second joint part 6 which constitutes the inner part.

As the driveshaft 1 is shown in its extended position, the longitudinal axes are identical of the first joint part 5, the second joint part 6 and the connecting journal 15. The longitudinal axis has been given the reference number 16. A convoluted boot 17 is also provided which covers the space between the outer face of the outer joint part 9 and the outer face of the connecting journal 15 so that the lubricant required to lubricate the first constant velocity joint is retained in the joint chamber.

The second constant velocity joint 3 includes a first joint part 19 which constitute the outer part. A connecting means includes a flange 18 which serves to connect the first joint part 19 to a driving or driven part of the driveline of the motor vehicle.

The second joint part 20 is received in the cavity of the first joint part 19. The design of the second constant velocity joint 3 substantially corresponds to that of the first constant velocity joint 2. Running grooves and balls are included to transmit torque between the two joints. The second joint part 20 of the second constant velocity joint 3 also includes an integrally formed on journal provided in the form of a plunging journal 21. The plunging journal outer face has circumferentially distributed first running grooves 22. As the second constant velocity joint 3 also assumes an extended position, the longitudinal axes of the second joint part 20 and the first joint part 19 are identical with the longitudinal axis 16 of the first constant velocity joint 2.

The first running grooves 22 of the plunging journal 21 serve to accommodate rolling contact members in the form of balls 23. Several balls 23 are arranged one behind the other in the running grooves 22. The balls 23 of all first running grooves 22 are held in a joint cage 24.

The connecting shaft 4 includes the plunging portion 26 which cooperates with the balls 23 arranged in the first running grooves 22 of the plunging journal 21. The shaft further includes the portion of transition 27 and the connecting portion 28 which is associated with the connecting journal 15 of the first constant velocity joint 2.

Between the outer face of the plunging portion 26 and the first joint part 19 of the second constant velocity joint 3, a convoluted boot 25 is arranged to seal the joint interior and to close the space between the plunging portion 26 and the plunging journal 21. The plunging portion 26 is provided in the form of a corrugated tube whose shape is obtained, for example, by a non-chip producing forming operation, starting from a cylindrical tube. The parts may be produced by drawing in a suitable forming tool, by hammering in a suitable forming tool or by rolling under the pressure of accordingly shaped pressure rollers. In its cross-section as illustrated in FIG. 2, the plunging portion 26 includes outer corrugation peaks 30 and outer corrugation valleys 31 arranged in an alternating sequence. The outer corrugation peak 30, in the bore of the plunging portion 26, is provided with a second running groove 29 arranged opposite a first running groove 22 of the plunging journal 21. Both serve to receive balls 23. In the bore of the plunging portion 26, near its end facing the second constant velocity joint 3, an extraction stop 33 is provided in the form of a securing ring. For this purpose, the plunging portion 26 includes a recess. The extraction stop 33 cooperates with a corresponding extraction stop 34 formed by the end face of the cage 24 and limits the movement of the cage 24 in the direction of the second constant velocity joint 3.

The plunging portion 26 is followed by the region of transition 27 which is also tubular and also includes grooves in continuation of the running grooves 29 and thus includes a corrugated cross-section. The portion of transition 27 changes into the connecting portion 28. In this embodiment, both have the same cross-sectional shape. However, their cross-section is reduced as compared to that of the plunging portion 26, thereby producing a shoulder 32 in the region of transition.

An insert 35 is inserted into the bore of the plunging portion 26, which axially rests against the shoulder 32. The insert 35 includes a face which forms an insertion stop 36 which cooperates with the insertion stop 37 facing away from the extraction stop 34 of the cage 24 and limits the insertion movement of the cage 24 towards the first constant velocity joint 2. Furthermore, the insert 35 includes a plunging stop 38 which, when the plunging journal 21 is in the fully inserted condition, is contacted by the end face 39 of the plunging journal 21. The end face 39 is designed as a stop face. However, the stop only serves to limit the insertion movement during the assembly of the driveshaft 1.

The outer face 41 of the connecting journal 15 associated with the second joint part 6 of the first constant velocity joint 2 is designed to match the inner face of the bore 40 of the connecting portion 28 of the connecting shaft 4. The journal 15 is shaped accordingly, with its cross-section including indentations and raised portions so that a non-rotating connection is achieved between the connecting journal 15 and the connecting portion 28 of the connecting shaft 4 when the connecting journal 15 is inserted into the bore 40.

Clamping means 42 is provided to axially fix the connecting shaft 4 and the connecting journal 15. The clamping means 42 is covered by a cap 43 to which the convoluted boot 17 is secured. The cap 43 is attached to the outer face of the connecting shaft 4.

In the embodiment of the driveshaft 1a according to FIG. 3, the connecting shaft shoulder formed in the region of the reduced cross-section of the plunging portion 26 towards the portion of transition 27 serves directly as an insertion stop 36a. The stop 36a is contacted by the stop face 37 of the cage 24. Otherwise, the embodiment largely corresponds to FIGS. 1 and 2.

In the two embodiments according to FIGS. 1, 2 and 3 respectively, the first running grooves 22 and second running grooves 29, in the direction of the longitudinal axis 16, are longer than the cage 24. This enables a rolling contact movement of the balls 23 in the first running grooves 22 and second running grooves 29. However, beyond the plunging distance provided for a rolling contact movement, a further reserve distance may be provided by means of which the connecting shaft 4 enables a change in the connecting length L between the connecting means 7, 8 and 18, respectively, of the two constant velocity joints 2, 3 for assembly of the driveshaft 1 and 1a. The shortening facility must be such that the connecting journal 7 may be inserted into an associated connecting bore of a driving or driven component. Subsequently, the flange 18 of the second constant velocity joint 3 may be moved into the necessary connecting position to enable the joint 3 to be connected to a driving or driven part of the driveline.

Figure 4:
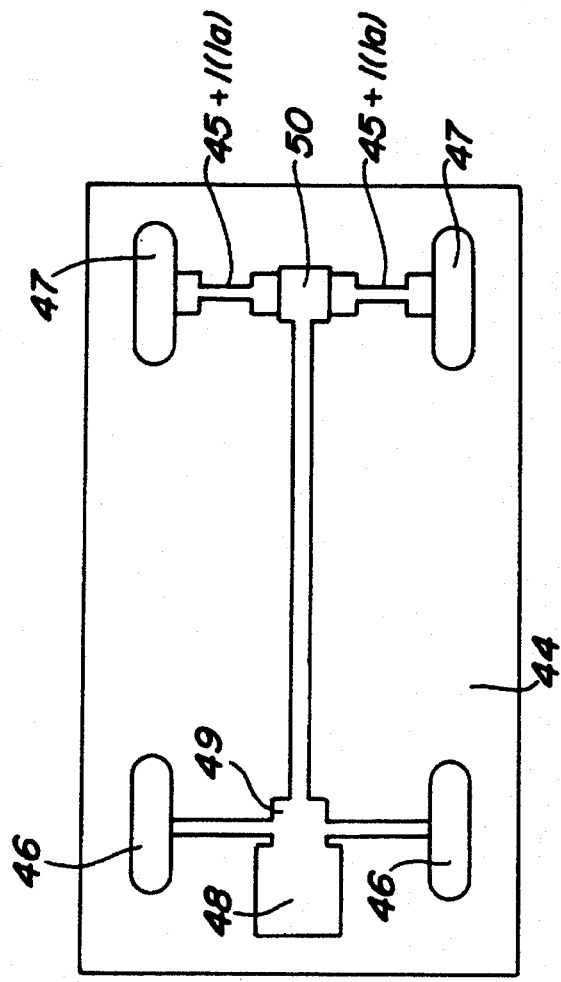
FIG. 4 is a schematic view of the drive concept of a front wheel drive motor vehicle in which driveshafts in accordance with the invention are used.

The driveshafts 1 and 1a according to FIGS. 1 to 3 are used in the driveline of a motor vehicle 44 according to FIG. 4, for example, whose rear wheels 47 associated with the rear axle 45 are driven. The front wheels 46 are not driven. The driveshafts 1 and 1a serve to drive the rear wheels 47, the driving action starting from the engine 48 and continuing via the gearbox 49 and the rear axle differential 50.

There are provided two driveshafts 1 or 1a one of which is used to connect the rear axle differential 50 to the left rear wheel 47 and the other one to connect the rear axle differential 50 to the right rear wheel 47.

The driveshaft 1, 1a, by means of the connecting journal associated with the first constant velocity joint, may be connected to the left rear wheel 47. The second constant velocity joint, by means of the associated connecting flange, is connected to a corresponding output flange of the rear axle differential 50 of the gearbox output end serving to drive the left rear wheel 47.

While the above detailed description describes the preferred embodiment of the present invention, the invention is susceptible to modification, variation and alteration without deviating from the scope and fair meaning of the subjoined claims.

We claim:

1. A driveshaft for use in a driveline for driving the wheels of a motor vehicle, comprising:

two constant velocity joints each having a first joint part with connecting means to establish a connection with a driving or driven part of a driveline, each constant velocity joint having a second joint part with said two constant velocity joints being connected to one another by a connecting shaft, and said two constant velocity joints being designed as constant velocity fixed joints enabling only angular movements between their first and second joint parts;

means for enabling changes in the distance between the connecting means, said means for enabling change including a plunging journal and plunging portion, said plunging journal is fast with one of the two second joint parts and having a longitudinal axis identical to that of the associated second joint part, said plunging journal, in its outer face, including a plurality of circumferentially distributed first running grooves extending parallel to the longitudinal axis, said connecting shaft is provided in the form of a tube including said plunging portion which is movably entered by the plunging journal, having a cross-section of the plunging portion is corrugated, with an outer corrugation peak and an outer corrugation valley alternating on the outer circumference and said bore of the plunging portion including second running grooves which are positioned opposite the first running grooves of the plunging journal and extend parallel to the longitudinal axis and said second running grooves being arranged in an outer corrugation peak, and after each first and second running grooves, one of each forming a pair, receive a plurality of rolling contact members arranged one behind the other along said running grooves.

2. A driveshaft according to claim 1, wherein said plunging portion is produced by a non-chip producing forming operation.

3. A driveshaft according to claim 2, wherein the plunging portion is produced from a steel tube by hammering, rolling or drawing.

4. A driveshaft according to claim 1, wherein the rolling contact members associated with all running grooves are held in a cage and said cage is movable to a limited extent relative to the plunging journal and the plunging portion along the longitudinal axis.

5. A driveshaft according to claim 1, wherein plunging portion is provided with stops for limiting the movement of the rolling contact members and/or a cage.

6. A driveshaft according to claim 5, wherein one of the stops form part of an insert inserted plunging portion.

7. A driveshaft according to claim 6, wherein said insert is supported against a shoulder formed as a result of a cross-sectional reduction in the region of transition between said plunging portion and an adjoining portion.

8. A driveshaft according to claim 1, wherein said plunging portion is provided with a plunging stop for the plunging journal for limiting the distance by which the plunging journal is inserted into the plunging portion.

9. A driveshaft according to claim 8, wherein one of the plunging stops form part of an insert of the plunging portion.

10. A driveshaft according to claim 1, wherein apart from the plunging portion, the connecting shaft includes a connection portion for securing to the second joint part of the other constant velocity joint.

11. A driveshaft according to claim 10, wherein said connecting shaft includes a portion of transition between the plunging portion and the connecting portion.

12. A driveshaft according to claim 11, wherein the cross-section of the plunging portion is increased relative to that of the portion of transition and/or said connecting portion.

13. A driveshaft according to claim 11, wherein said corrugated shape of the plunging portion is continued in the portion of transition and/or in the connecting portion.

14. A driveshaft according to claim 1, wherein the plunging journal is hollow.

15. A driveshaft according to claim 1, wherein the second joint part of the other constant velocity joint includes a connecting journal which constitutes an extension of its longitudinal axis and which engages the connecting portion of the connecting shaft and is secured thereto.

16. A driveshaft according to claim 15, wherein the connecting journal comprises a corrugated shape which is adapted to the corrugated shape of the connecting portion and which serves to provide a non-rotating connection between the connecting journal and the connecting portion.

17. A driveshaft according to claim 15, wherein the connecting journal is secured to the connecting portion by clamping means.

18. A driveshaft according to claim 1, wherein the rolling contact members are provided in the form of balls.

19. A driveshaft according to claim 1, wherein the running grooves of the plunging journal are produced by a non-chip producing forming operation.

* * * * *

UNITED STATES PATENT AND TRADEMARK OFFICE
CERTIFICATE OF CORRECTION

PATENT NO. : 5,611,733
DATED : March 18, 1997
INVENTOR(S) : Werner Jacob, Manfred Niederhüfner and Jürgen E. Heyne It is certified that error appears in the above-indentified patent and that said Letters Patent is hereby corrected as shown below:

Column 1 of the cover page, under [56] References Cited
under U.S. PATENT DOCUMENTS, please add
the following patents which were not included on the printed patent:

| | | |
|---|---|---|
| 1,507,991 | 9/1924 | Edwards |
| 2,680,634 | 6/1954 | Haworth et al |
| 3,132,494 | 5/1964 | Hoffer |
| 3,744,577 | 7/1973 | Williams |
| 4,254,639 | 3/1981 | Teramachi |
| 4,509,386 | 4/1985 | Kimberlin |
| 4,556,398 | 12/1985 | Baldenko et al |
| 4,650,441 | 3/1987 | Lepson |
| 5,141,350 | 8/1992 | Hecke |
| 5,376,052 | 12/1994 | Jacob et al |
| 5,433,551 | 7/1995 | Gordon |

Column 1 of the cover page, under [56] References Cited
under FOREIGN PATENT DOCUMENTS, please add
the following patents which were not included on the printed patent:

| | | |
|---|---|---|
| 2180625 | 4/1987 | United Kingdom |
| 425238 | 5/1991 | Europe |

Signed and Sealed this

Fifth Day of August, 1997

Attest:

BRUCE LEHMAN

*Attesting Officer*     Commissioner of Patents and Trademarks